United States Patent
Karabinis

(10) Patent No.: US 7,917,135 B2
(45) Date of Patent: Mar. 29, 2011

(54) SATELLITE COMMUNICATIONS APPARATUS AND METHODS USING ASYMMETRICAL FORWARD AND RETURN LINK FREQUENCY REUSE

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 49 days.

(21) Appl. No.: 12/578,149

(22) Filed: Oct. 13, 2009

(65) Prior Publication Data
US 2010/0041396 A1 Feb. 18, 2010

Related U.S. Application Data

(63) Continuation of application No. 11/458,754, filed on Jul. 20, 2006, now Pat. No. 7,623,867.

(60) Provisional application No. 60/703,842, filed on Jul. 29, 2005.

(51) Int. Cl.
*H04W 4/00* (2009.01)
(52) U.S. Cl. ... 455/427; 455/13.1; 455/12.1; 455/456.1; 455/522
(58) Field of Classification Search .......... 455/427, 455/447, 456.1, 522, 13.1, 12.1
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — David Q Nguyen
(74) *Attorney, Agent, or Firm* — Myers Bigel Sibley & Sajovec, P.A.

(57) ABSTRACT

Communications are conducted between a space-based component of the wireless communications system and radioterminals using a plurality of forward link cells and a plurality of return link cells, the return link cells having a greater number of cells per frequency reuse cluster than the forward link cells. At least some of the forward and return link cells may use at least some frequencies of a terrestrial wireless communications system having an adjacent and/or overlapping coverage area. Forward links of the at least some of the forward and return link cells may have a greater link bandwidth than return links of the at least some of the forward and return link cells.

23 Claims, 4 Drawing Sheets

U.S. PATENT DOCUMENTS

| | | |
|---|---|---|
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,317,412 B1 * | 11/2001 | Natali et al. .................. 370/208 |
| 6,324,405 B1 | 11/2001 | Young et al. |
| 6,339,707 B1 | 1/2002 | Wainfan et al. |
| 6,400,946 B1 | 6/2002 | Vazvan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,842,437 B1 * | 1/2005 | Heath ........................... 370/322 |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,950,625 B2 * | 9/2005 | Regulinski et al. ......... 455/13.1 |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,266,103 B2 | 9/2007 | Anderson et al. |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 | 8/2009 | Karabinis et al. |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,394 B2 * | 11/2009 | Good et al. .................. 455/427 |
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,639,981 B2 | 12/2009 | Karabinis |
| 7,653,348 B2 | 1/2010 | Karabinis |
| 7,664,460 B2 | 2/2010 | Karabinis et al. |
| 7,696,924 B2 | 4/2010 | Levin et al. |
| 7,706,746 B2 | 4/2010 | Karabinis et al. |
| 7,706,748 B2 | 4/2010 | Dutta |
| 7,706,826 B2 | 4/2010 | Karabinis |
| 7,738,837 B2 | 6/2010 | Karabinis |
| 7,747,229 B2 | 6/2010 | Dutta |
| 7,751,823 B2 | 7/2010 | Karabinis |
| 7,756,490 B2 | 7/2010 | Karabinis |
| 7,783,287 B2 | 8/2010 | Karabinis |
| 7,792,069 B2 | 9/2010 | Karabinis |
| 7,792,488 B2 | 9/2010 | Karabinis et al. |
| 7,796,985 B2 | 9/2010 | Karabinis |
| 7,796,986 B2 | 9/2010 | Karabinis |
| 7,801,520 B2 | 9/2010 | Karabinis |
| 7,813,700 B2 | 10/2010 | Zheng et al. |
| 7,817,967 B2 | 10/2010 | Karabinis et al. |
| 7,831,201 B2 | 11/2010 | Karabinis |
| 7,831,202 B2 | 11/2010 | Karabinis |
| 7,831,251 B2 | 11/2010 | Karabinis et al. |
| 7,856,211 B2 | 12/2010 | Karabinis |
| 2001/0018327 A1 | 8/2001 | Houston et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0054815 A1 | 3/2003 | Karabinis |
| 2003/0068978 A1 | 4/2003 | Karabinis et al. |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |

| | | |
|---|---|---|
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1* | 9/2005 | Karabinis .................. 455/12.1 |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1* | 11/2005 | Karabinis et al. ........... 455/12.1 |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0135058 A1 | 6/2006 | Karabinis |
| 2006/0135060 A1 | 6/2006 | Karabinis |
| 2006/0135070 A1 | 6/2006 | Karabinis |
| 2006/0165120 A1 | 7/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0246838 A1 | 11/2006 | Karabinis |
| 2006/0252368 A1 | 11/2006 | Karabinis |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0184849 A1* | 8/2007 | Zheng ..................... 455/456.1 |
| 2007/0192805 A1* | 8/2007 | Dutta et al. ..................... 725/64 |
| 2007/0202816 A1 | 8/2007 | Zheng |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0242339 A1* | 10/2008 | Anderson .................... 455/522 |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 030 467 A1 | 8/2000 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 97/37505 | 10/1997 |
| WO | WO 01/54314 A1 | 7/2001 |
| WO | WO 03/069936 A1 | 8/2003 |

OTHER PUBLICATIONS

Ayyagari et al., "A satellite-augmented cellular network concept", *Wireless Networks*, Vo. 4, 1998, pp. 189-198.

International Search Report, PCT/US2006/028450, Feb. 6, 2007.

* cited by examiner

SATELLITE COMMUNICATIONS APPARATUS AND METHODS USING ASYMMETRICAL FORWARD AND RETURN LINK FREQUENCY REUSE

CROSS-REFERENCE TO RELATED APPLICATION

This application is a continuation of U.S. patent application Ser. No. 11/458,754, filed Jul. 20, 2006, entitled Satellite Communications Apparatus and Methods Using Asymmetrical Forward and Return Link Frequency Reuse, and claims the benefit of U.S. Provisional Application Ser. No. 60/703,842, filed Jul. 29, 2005 entitled Satellite Communications Apparatus And Methods Using Asymmetrical Forward And Return Link Frequency Reuse, assigned to the assignee of the present application, the disclosures of both of which are hereby incorporated herein by reference in their entirety as if set forth fully herein.

FIELD OF THE INVENTION

This invention relates to wireless communications systems and methods, and more particularly to satellite and terrestrial wireless communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," or simply as a "terminal". As used herein, the term(s) "radioterminal," "radiotelephone," mobile terminal," "user device" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332. Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/ GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892, 068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/ 0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/ 0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/ 0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/ 0203742, 2004/0240525, 2005/0026606, 2005/0037749, 2005/0041619, 2005/0064813, 2005/0079816, 2005/ 0090256, 2005/0118948, 2005/0136836, 2005/0164700, 2005/0164701, 2005/0170834, 2005/0181786, 2005/ 0201449, 2005/0208890, 2005/0221757, 2005/0227618, 2005/0239457, 2005/0239403, 2005/0239404, 2005/ 0239399, 2005/0245192, 2005/0260984, 2005/0260947, 2005/0265273, 2005/00272369, 2005/0282542, 2005/ 0288011, 2006/0040613, 2006/040657 and 2006/0040659; all of which are assigned to the assignee of the present invention, the disclosures of all of which are hereby incorporated herein by reference in their entirety as if set forth fully herein.

SUMMARY OF THE INVENTION

Some embodiments of the present invention provide methods of operating wireless communications systems. In some embodiments, communications are conducted between a space-based component of the wireless communications system and radioterminals using a plurality of forward link cells and a plurality of return link cells, the return link cells having a greater number of cells per frequency reuse cluster than the forward link cells. Forward links of the forward link cells may have a greater link bandwidth than return links of the return link cells.

In some embodiments of the present invention, at least some of the forward and return link cells use at least some frequencies of a terrestrial wireless communications system having an adjacent and/or overlapping coverage area. Forward links of the at least some of the forward and return link cells may have a greater link bandwidth than return links of the at least some of the forward and return link cells. Service links of the terrestrial wireless communications system using forward link frequencies of the at least some of the forward and return link cells may have substantially the same link bandwidth as forward links of the at least some of the forward and return link cells using the forward link frequencies, and service links of the terrestrial wireless communications system using return link frequencies of the at least some of the forward and return link cells may have substantially the same link bandwidth as return links of the at least some of the forward and return link cells using the return link frequencies.

Communications on forward and return links of the at least some of the forward and return link cells may be frequency-division duplexed and communications on service links of the terrestrial wireless communications system may be time-division duplexed. Communications on service links of the terrestrial wireless communications system may be orthogonal frequency division multiplexed.

In some embodiments, the space-based component and radioterminals may communicate using a first air interface protocol, and the terrestrial wireless communications system and radioterminals may communicate using a second air interface protocol substantially different than the first air interface protocol. In some embodiments, the space-based component and the terrestrial wireless communications system may communicate with radioterminals using substantially the same air interface protocol. For example, the space-based component and radioterminals may communicate using a time division multiplexed (TDM) air interface protocol, a time division multiple access (TDMA) air interface protocol, a code division multiplexed (CDM) air interface protocol, a code division multiple access (CDMA) air interface protocol, an orthogonal frequency division multiplexed (OFDM) air interface protocol, and/or an orthogonal frequency division multiple access (OFDMA) air interface protocol, and the terrestrial wireless communications system and radioterminal may communicate using a time division multiplexed (TDM) air interface protocol, a time division multiple access (TDMA) air interface protocol, a code division multiplexed (CDM) air interface protocol, a code division multiple access (CDMA) air interface protocol, an orthogonal frequency division multiplexed (OFDM) air interface protocol, and/or an orthogonal frequency division multiple access (OFDMA) air interface protocol.

According to further aspects of the present invention, transmissions of radiators of the terrestrial wireless communications system located proximate a boundary of the coverage area of the terrestrial wireless communications system may be directed away from a portion of a coverage area of the space-based component outside of the coverage area of the terrestrial wireless communications system. For example, transmissions of the radiators of the terrestrial wireless communications system located proximate the boundary of the coverage area of the terrestrial wireless communications system may directed toward an inner portion of the coverage area of the terrestrial wireless communications system.

According to additional aspects, multiple ones of the return link cells overlap a single one of the forward link cells. For example, the forward link cells may have a unity frequency reuse cluster size and the return link cells may have a frequency reuse cluster size greater than one. In some embodiments, respective frequency reuse clusters for the return link cells may be substantially spatially coextensive with respective ones of the forward link cells.

In additional embodiments of the present invention, a wireless communications system includes a space-based component configured to communicate with radioterminals using a plurality of forward link cells and a plurality of return link cells, the return link cells having a greater number of cells per frequency reuse cluster than the forward link cells. Forward links of the forward link cells may have a greater link bandwidth than return links of the return link cells.

In some embodiments, at least some of the forward and return link cells use at least some frequencies of a terrestrial wireless communications system having an adjacent and/or overlapping coverage area. Forward links of the at least some of forward and return link cells may have a greater link bandwidth than return links of the at least some of the forward and return link cells. Service links of the terrestrial wireless communications system using forward link frequencies of the at least some of the forward and return link cells may have substantially the same link bandwidth as forward links of the at least some of the forward and return link cells using the forward link frequencies, and service links of the terrestrial wireless communications system using return link frequencies of the at least some of the forward and return link cells may have substantially the same link bandwidth as return links of the at least some of the forward and return link cells using the return link frequencies.

In further embodiments, a wireless communications system includes a space-based component configured to communicate with radioterminals using a plurality of forward link cells and a plurality of return link cells, the return link cells having a greater number of cells per frequency reuse cluster than the forward link cells, and an ancillary terrestrial component adjacent and/or overlapped by at least some of the forward link cells and the return link cells and configured to communicate with radioterminals using at least some frequencies used by the at least some of the forward and return link cells.

Additional embodiments of the present invention provide a terrestrial wireless communications system including at least one station configured to communicate with radioterminals in a coverage area adjacent and/or overlapped by forward link cells and return link cells served by a space-based component of a wireless communication system. The return link cells have a greater number of cells per frequency reuse cluster than the forward link cells and the at least one station is configured to use at least some frequencies used by the forward and return link cells.

DETAILED DESCRIPTION

Specific exemplary embodiments of the invention now will be described with reference to the accompanying drawing. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first radioterminal below could be termed a second radioterminal, and similarly, a second radioterminal may be termed a first radioterminal without departing from the teachings of the present invention. As used herein, the term "and/or" includes any and all combinations of one or more of the associated listed items. The symbol "/" is also used as a shorthand notation for "and/or".

Figure 1:
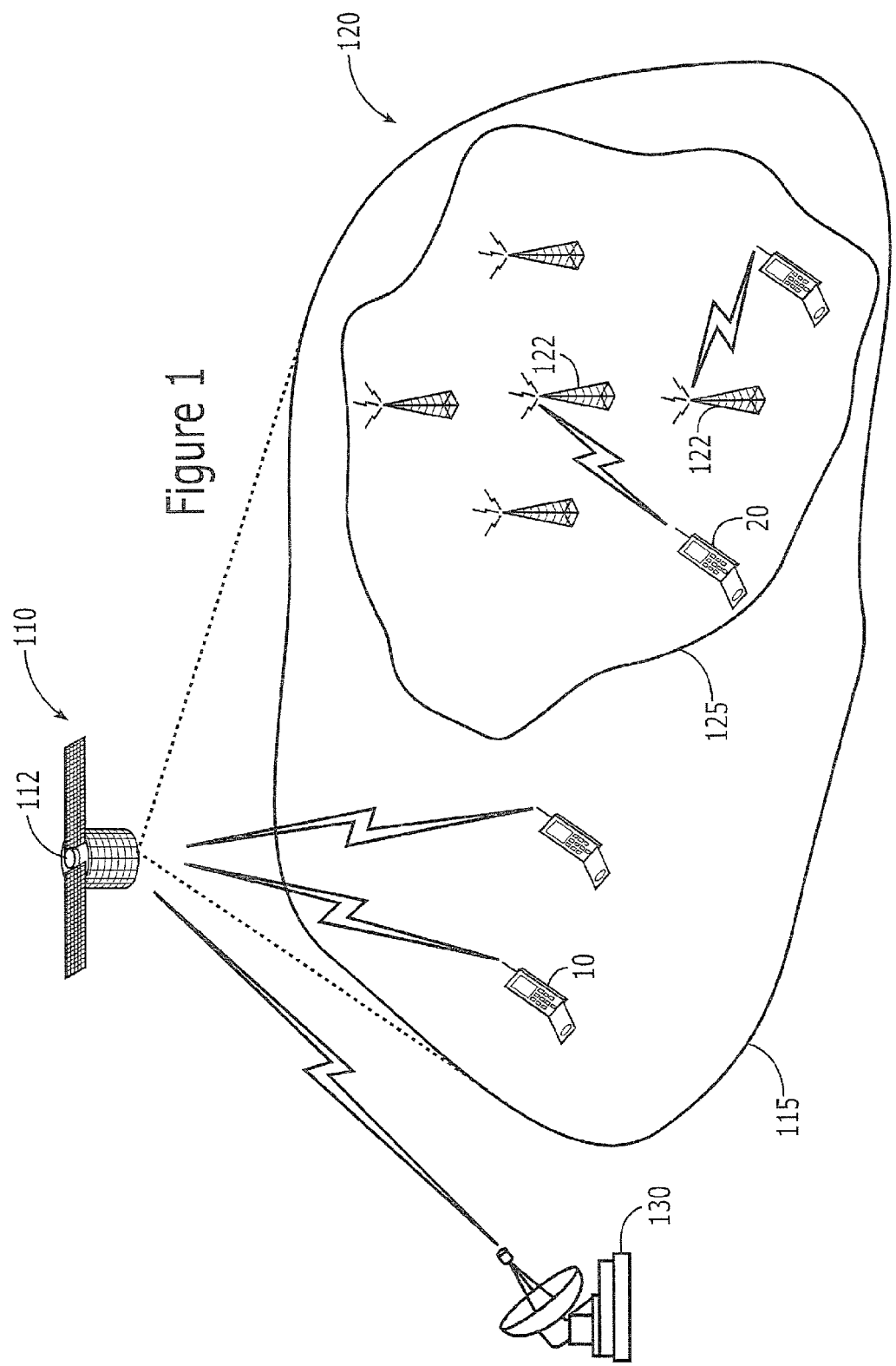
FIG. 1 is a schematic diagram illustrating wireless communications systems and methods according to some embodiments of the present invention.

FIG. 1 illustrates a wireless communications system comprising a Space-Based Component (SBC) 110 and an Ancillary Terrestrial Component (ATC) 120. The SBC 110 may comprise at least one satellite 112, which may be a geo-stationary or substantially geo-stationary satellite. The at least one satellite 110 is configured to communicate with radioterminals 10 and may also be configured to communicate with at least one satellite gateway 130. The ATC 120 may comprise at least one infrastructure element, e.g., one or more base stations 122, each of which are configured to communicate with radioterminals 20. It will be understood that although FIG. 1 illustrates the ATC 120 as including five base stations 122, a larger or smaller number of base stations may be provided. As shown, a service footprint 125 of the ATC 120 overlaps a service footprint 115 of the SBC 110. It will be appreciated that, generally, service footprints of an SBC and ATC may be adjacent and/or overlapping, e.g., coextensive, partially overlapping or mutually exclusive. It will be further understood that the radioterminals 10, 20 may be single mode and/or dual-mode terminals, i.e., terminals that are configured to communicate with only one of the SBC 110 or the ATC 120 and/or terminals that are configured to communicate with both the SBC 110 and the ATC 120. It will be understood that the space-based infrastructure and the terrestrial infrastructure shown in FIG. 1 may be components (subsystems) of an integrated system or may be separate systems, e.g., a mobile satellite communications system having a coverage area adjacent to and/or overlapped by a terrestrial wireless communications system, which may be operated in coordination and/or independently and autonomously.

Figure 2:
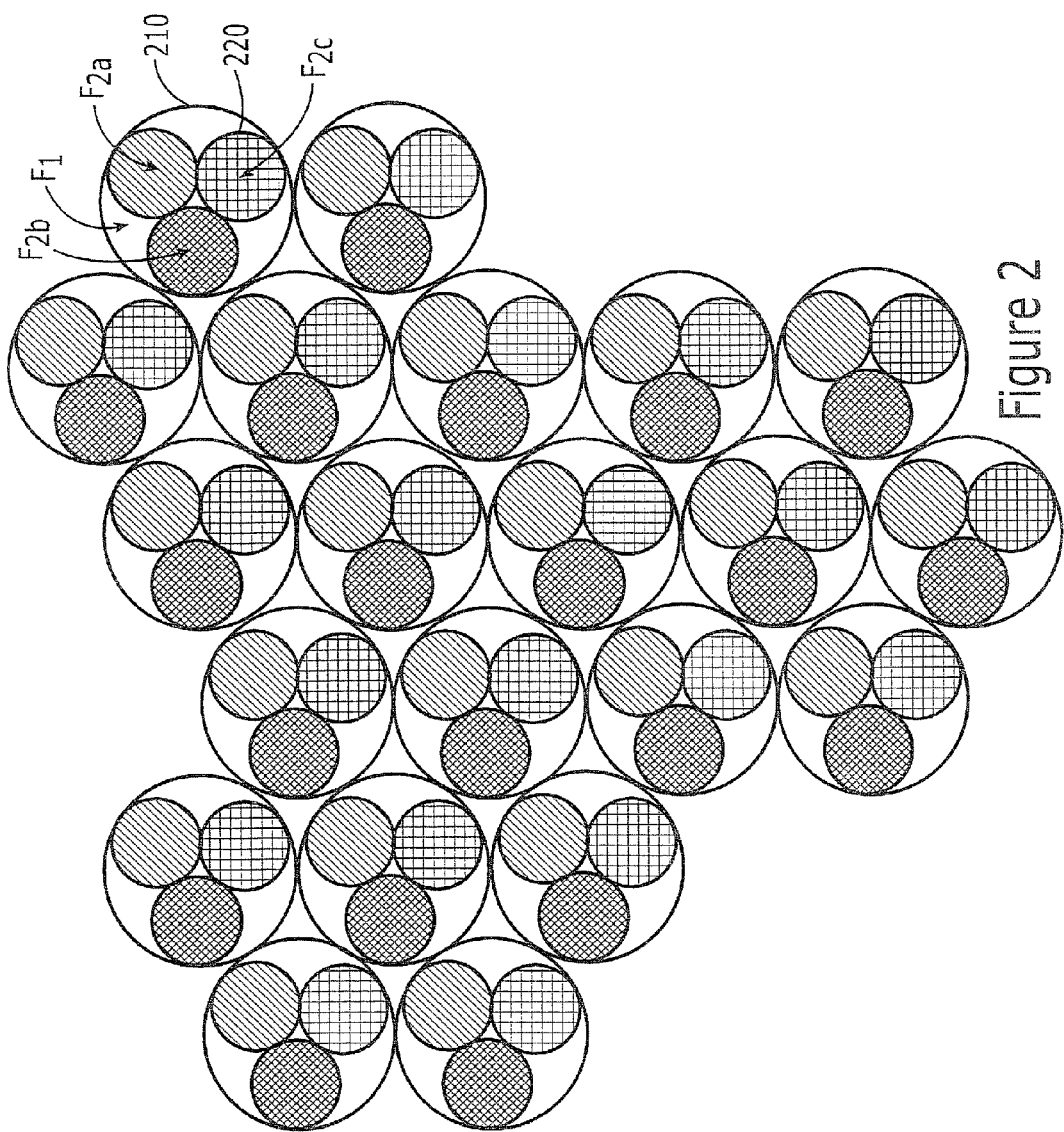
FIG. 2 is a schematic diagram illustrating an example of a forward and return link cell reuse pattern according to further embodiments of the present invention.

Referring to FIGS. 1 and 2, the SBC 110, at least one satellite gateway 130 and/or other system element that is connected to the SBC 110 and/or the at least one satellite gateway 130 may be configured to form a plurality of forward service link beams (cells, or antenna patterns) 210 and a plurality of return service link beams (cells, or antenna patterns) 220 using respective pluralities of forward and return service link SBC antenna feed elements. The SBC 110 may be configured to provide forward service link communications to a first plurality of radioterminals that are geographically distributed over a plurality of SBC forward service link beams by using a first set of frequencies $F_1$ (at least some of which may be used by an adjacent and/or overlapping terrestrial wireless communications system) over each of the forward service link beams 210 to thereby provide immediate frequency reuse over the forward service link beams 210, i.e., a reuse factor of one (1). The SBC 110 may be further configured to provide return service link communications to a second plurality of radioterminals that are geographically distributed over a plurality of the SBC return service link beams 220 by selectively using a second set of frequencies $F_2$, e.g., frequency subsets $F_{2a}$, $F_{2b}$, $F_{2c}$ of the set $F_2$ (at least some of which may be used by an adjacent and/or overlapping terrestrial wireless communications system), to thereby provide frequency reuse that is based on a frequency reuse cell cluster size comprising more than one return service link beam 220, i.e., a frequency reuse factor greater than one. Accordingly, in some embodiments of the invention, an SBC is configured to communicate with radioterminals using immediate forward service link frequency reuse and communicate with radioterminals using a return service link frequency reuse comprising a cell cluster size that contains more than one cell.

It will be understood that "selectively using" means selectively using the frequencies on a geographic basis and that, in some embodiments, the first and second plurality of radioterminals may be the same plurality of radioterminals. It will be further understood that the arrangement of beams 210, 220 shown in FIG. 2 is provided for purposes of illustration, and that embodiments of the invention may use any of a number of different arrangements of forward and return link beams or cells. For example, the forward link and/or return link cells may have different footprint shapes/contours than those shown in FIG. 2. In some embodiments, at least some forward link beams (cells or antenna patterns) may have substantially similar geographic footprints and/or may be substantially geographically congruent with at least some return link beams (cells or antenna patterns). FIG. 2 illustrates a three-cell cluster size for the return link beams 220, but in other embodiments of the invention, greater or lesser cluster sizes may be used. It will also be understood that, while FIG. 2 illustrates forward link cells 210 and return link cells that are aligned such that each return link cell 220 does not overlap more than one forward link cell 210, in other embodiments of the invention, different alignments of forward and return link cells may be used, such as arrangements wherein return link cells overlap multiple forward link cells.

Figure 4:
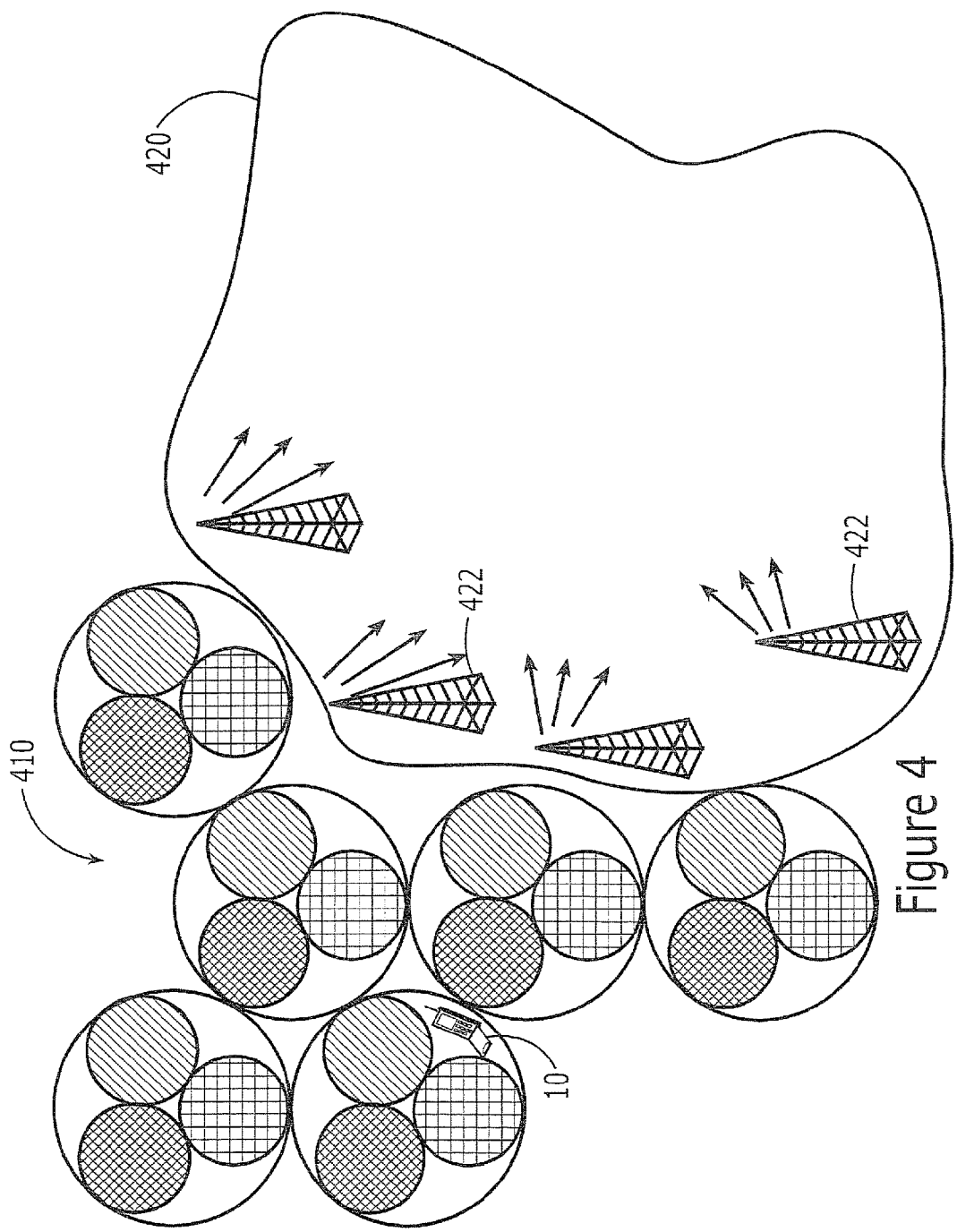
FIG. 4 is a schematic diagram illustrating directed transmission from peripheral radiators of terrestrial wireless communications system according to some embodiments of the present invention.

Embodiments of the invention may allow for higher forward service link (i.e., SBC to radioterminal(s)) data throughput by allowing the SBC to use, with a frequency reuse factor of one (1) (i.e., immediate frequency reuse), a maximum available frequency range and/or a maximum number of available carrier frequencies in forward link cells as needed and/or subject to at least one predetermined communications performance/service measure, such as, for example, a Bit Error Rate (BER), an interference level and/or a user profile, to thereby provide increased forward service link data throughput to one or more radioterminals while providing reduced inter-cell return service link interference by providing non-unity (non-immediate) frequency reuse among return link beams. Immediate frequency reuse on forward service links and non-immediate frequency reuse on return service links may not substantially reduce a capacity of the SBC compared to using an identical frequency reuse (immediate or non-immediate) on the forward and return service links. In some embodiments, immediate frequency reuse on forward service links and non-immediate frequency reuse on return service links may even increase a capacity of the SBC compared to using immediate frequency reuse on the forward and return service links, as interference to the ATC and/or the radioterminals communicating therewith due to the immediate downlink frequency reuse by the SBC may be kept to an acceptable level owing to the signal strength associated with an SBC forward link(s) being relatively small at or near the earth compared to a signal strength associated with the ATC. As shown, in FIG. 4, in order to reduce a level of interference to a radioterminal 10 that is receiving communications from the SBC in a coverage area 410 outside a geographic area 420 that is served by the ATC, at least some ATC infrastructure radiators 422 (i.e., base station antenna(s)), that may be proximate to a perimeter of the service area of the ATC, may provide attenuated radiation in directions that point substantially away from an inner location of the ATC coverage area.

Figure 3:
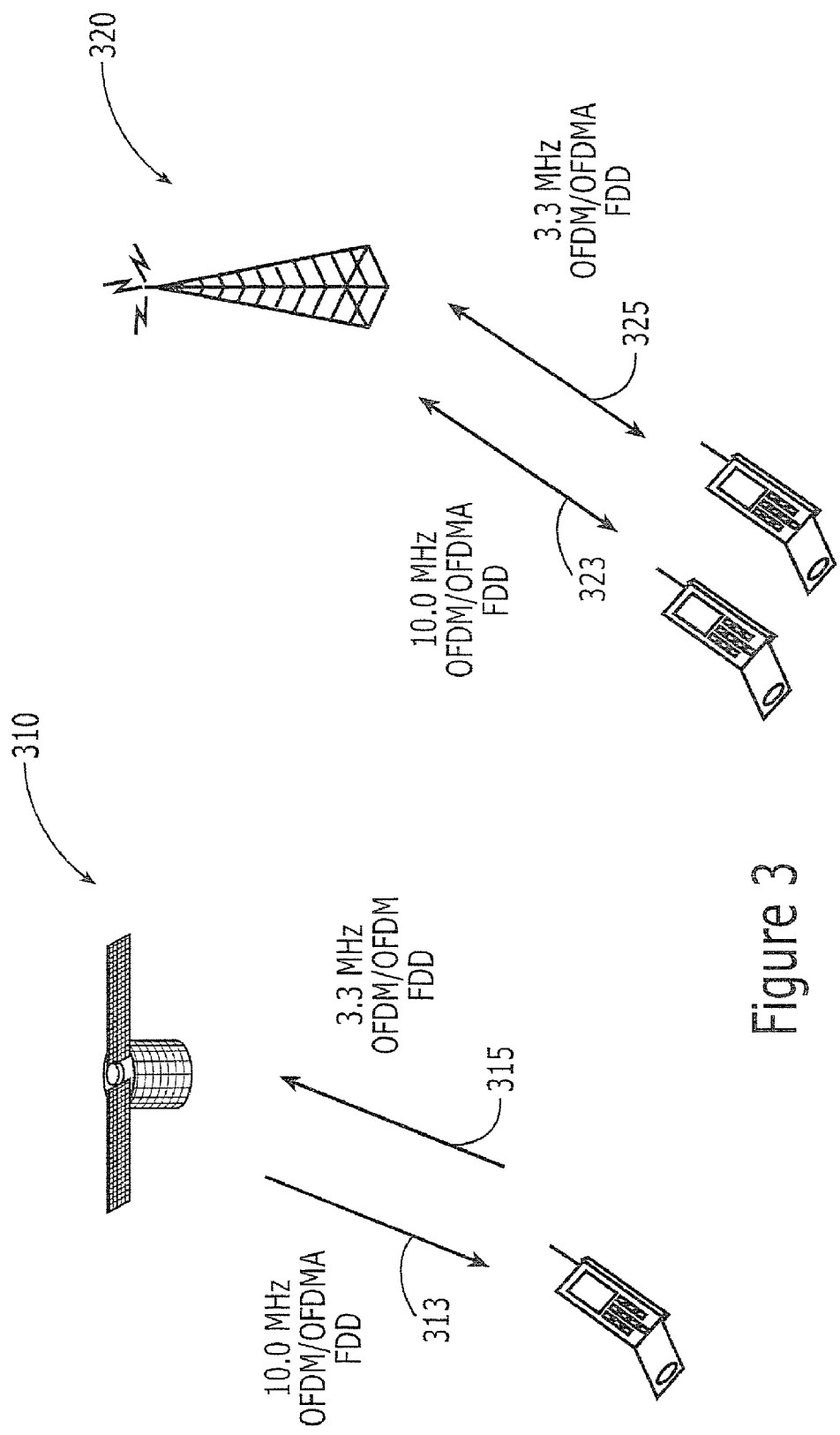
FIG. 3 is a schematic diagram illustrating an example of a link bandwidth assignment according to further embodiments of the present invention.

FIG. 3 illustrates asymmetric forward and return link bandwidths that may be provided using asymmetric frequency reuse along the lines described above with reference to FIG. 2 (symmetric forward and return link bandwidths may also be provided in some embodiments of the invention). An SBC 310 and an ATC 320 may be configured to use an Orthogonal Frequency Division Multiplexed (OFDM) and/or Orthogonal Frequency Division Multiple Access (OFDMA) air interface protocol to communicate with radioterminals. In some embodiments, the air interface protocol used on service links of the ATC 320 may be based on a Time Division Duplex (TDD) mode and the air interface protocol of the SBC 310 may be based on a Frequency Division Duplex (FDD) mode. In some embodiments, for example, the SBC 310 provides a 10 MHz forward link 313 and a 3.3 MHz return link 315 within the geographic area of a SBC cell (beam or antenna pattern) to thereby provide communications to one or more radioterminals and the ATC 320 provides a 10 MHz forward/return TDD service link 323 based on forward/return service link frequencies of the SBC and/or a 3.3 MHz forward/return TDD service link 325 based on forward/return service link frequencies of the SBC to thereby provide communications to one or more radioterminals within a service region of the ATC.

It will be understood that an SBC and ATC may use any of a number of different types of air interface protocols in various embodiments of the invention. An air interface protocol used by the SBC to communicate with radioterminals may be the same, substantially the same or different compared to an air interface protocol that is used by the ATC to communicate with radioterminals (i.e., the SBC may use a Time Division Multiplexed (TDM) and/or Time Division Multiple Access (TDMA) air interface protocol and the ATC may use a Code Division Multiplexed (CDM) and/or Code Division Multiple access (CDMA) air interface protocol or vice versa, for example). It will be further understood that the carrier bandwidths shown in FIG. 3 are provided for illustrative purposes only, and that other carrier bandwidths may be used.

It will be appreciated that the apparatus and operations described above are illustrative examples, and that other architectures and operations fall within the scope of the present invention. More generally, in the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of operating a wireless communications system, the method comprising:
    transmitting from a device information using a plurality of forward link cells each one of which is associated with a service region, wherein the plurality of forward link cells comprises a plurality of forward frequency reuse clusters, each one of which comprises at least one forward link cell of the plurality of forward link cells, and each one of which uses a set of forward link frequencies such that a set of forward link frequencies that is used by a first forward frequency reuse cluster over a first forward service region is also used by a second forward frequency reuse cluster over a second forward service region that does not overlap with the first forward service region; and
    receiving information using a plurality of return link cells each one of which is associated with a service region, wherein the plurality of return link cells comprises a plurality of return frequency reuse clusters, each one of which comprises at least one return link cell of the plurality of return link cells, and each one of which uses a set of return link frequencies such that a set of return link frequencies that is used by a first return frequency reuse cluster over a first return service region is also used by a second return frequency reuse cluster to provide communications over a second return service region that does not overlap with the first return service region;
    wherein each one of the plurality of return frequency reuse clusters comprises a number of return link cells that is greater than a number of forward link cells that is included in each one of the plurality of forward frequency reuse clusters.

2. The method of claim 1, wherein the transmitting comprises transmitting information over a bandwidth that is greater than a bandwidth that is associated with the receiving.

3. The method of claim 1, wherein the transmitting and receiving comprise transmitting and receiving information using a frequency division duplex protocol.

4. The method of claim 1, wherein the transmitting and/or receiving comprise transmitting and receiving information using a time division duplex, orthogonal frequency division multiplexed and/or orthogonal frequency division multiple access protocol.

5. The method of claim 1, wherein the transmitting and receiving are associated with a first wireless communications system and wherein at least some of the plurality of forward and/or return link cells use at least some frequencies that are associated with and/or are also used by a second wireless communications system.

6. The method of claim 1, wherein the transmitting and/or receiving comprise transmitting and receiving information using a time division multiplexed (TDM) air interface protocol, a time division multiple access (TDMA) air interface protocol, a code division multiplexed (CDM) air interface protocol, a code division multiple access (CDMA) air interface protocol, an orthogonal frequency division multiplexed (OFDM) air interface protocol, and/or an orthogonal frequency division multiple access (OFDMA) air interface protocol.

7. The method of claim 1, wherein multiple cells of the plurality of return link cells overlap a single cell of the plurality of forward link cells.

8. The method of claim 7, wherein the plurality of forward link cells comprises a forward frequency reuse cluster size that comprises one cell and wherein the plurality of return link cells comprises a return frequency reuse cluster size that comprises more than one cell.

9. The method of claim 8, wherein respective return frequency reuse clusters of the plurality of return link cells are substantially spatially coextensive with respective forward link cells of the plurality of forward link cells.

10. The method of claim 1, wherein the wireless communications system comprises a space-based component and wherein the transmitting and the receiving are associated with the space-based component.

11. The method of claim 5, wherein the first wireless communications system comprises a space-based component wherein the transmitting and the receiving are associated with the space-based component and wherein the second wireless communications system comprises a terrestrial wireless communications system.

12. A wireless communications system comprising:
    a transmitter that is configured to communicate with radio terminals using a plurality of forward link cells each one of which is associated with a service region of the transmitter, wherein the plurality of forward link cells comprises a plurality of forward frequency reuse clusters, each one of which comprises at least one forward link cell of the plurality of forward link cells, and each one of which uses a set of forward link frequencies such that a set of forward link frequencies that is used by a first forward frequency reuse cluster to provide communications from the transmitter to radio terminals over a first forward service region of the transmitter is also used by a second forward frequency reuse cluster to provide communications from the transmitter to radio terminals over a second forward service region of the transmitter that does not overlap with the first forward service region of the transmitter; and
    a receiver that is configured to communicate with radio terminals using a plurality of return link cells each one of which is associated with a service region of the receiver, wherein the plurality of return link cells comprises a plurality of return frequency reuse clusters, each one of which comprises at least one return link cell of the plurality of return link cells, and each one of which uses a set of return link frequencies such that a set of return link frequencies that is used by a first return frequency reuse cluster to provide communications from radio terminals to the receiver over a first return service region of the receiver is also used by a second return frequency reuse cluster to provide communications from radio terminals to the receiver over a second return service region of the receiver that does not overlap with the first return service region of the receiver;

wherein each one of the plurality of return frequency reuse clusters comprises a number of return link cells that is greater than a number of forward link cells that is included in each one of the plurality of forward frequency reuse clusters.

13. The system of claim 12, wherein a forward link of the forward link cells comprises a bandwidth that is greater than a bandwidth of a return link of the return link cells.

14. The system of claim 12, wherein a forward link of the forward link cells and a return link of the return link cells are based upon a frequency division duplex protocol.

15. The system of claim 12, wherein a forward link of the forward link cells and/or a return link of the return link cells is/are based upon a time division duplex, orthogonal frequency division multiplexed and/or orthogonal frequency division multiple access protocol.

16. The system of claim 12, wherein the transmitter and the receiver are associated with a first wireless communications system and wherein at least some of the plurality of forward and/or return link cells use at least some frequencies that are associated with and/or are also used by a second wireless communications system.

17. The system of claim 12, wherein the transmitter and/or the receiver is/are configured to communicate with radioterminals using a time division multiplexed (TDM) air interface protocol, a time division multiple access (TDMA) air interface protocol, a code division multiplexed (CDM) air interface protocol, a code division multiple access (CDMA) air interface protocol, an orthogonal frequency division multiplexed (OFDM) air interface protocol, and/or an orthogonal frequency division multiple access (OFDMA) air interface protocol.

18. The system of claim 12, wherein the wireless communications system comprises a space-based component and wherein the space-based component comprises the transmitter and the receiver.

19. The system of claim 16, wherein the first wireless communications system comprises a space-based component wherein the transmitter and the receiver are associated with the space-based component and wherein the second wireless communications system comprises a terrestrial wireless communications system.

20. A radioterminal configured to communicate with the system of claim 12.

21. The system of claim 12, wherein multiple cells of the plurality of return link cells overlap a single cell of the plurality of forward link cells.

22. The system of claim 21, wherein the plurality of forward link cells comprises a forward frequency reuse cluster size that comprises one cell and wherein the plurality of return link cells comprises a return frequency reuse cluster size that comprises more than one cell.

23. The system of claim 22, wherein respective return frequency reuse clusters of the plurality of return link cells are substantially spatially coextensive with respective forward link cells of the plurality of forward link cells.

* * * * *